United States Patent [19]

Weis

[11] 4,309,063
[45] Jan. 5, 1982

[54] BEARING SEAL

[75] Inventor: Siegfried K. Weis, Byron Center, Mich.

[73] Assignee: C. L. Frost & Son, Inc., Grand Rapids, Mich.

[21] Appl. No.: 155,506

[22] Filed: Jun. 2, 1980

[51] Int. Cl.³ .................. F16C 33/78; F16J 15/32
[52] U.S. Cl. ............................. 308/187.2; 277/94
[58] Field of Search ............... 308/36.1, 187.1, 187.2; 277/57, 92, 94, 96.1

[56] References Cited

U.S. PATENT DOCUMENTS

| 2,144,691 | 1/1939 | Schmal | 308/187.2 |
| 2,428,041 | 9/1947 | Saywell | 308/187.2 |
| 2,566,322 | 9/1951 | Flowers | 308/187.1 |
| 2,600,434 | 6/1952 | Saywell | 286/11 |
| 3,010,771 | 11/1961 | Cogger | 308/187.2 |
| 3,101,954 | 8/1963 | Huddle | 277/39 |
| 3,203,740 | 8/1965 | Peikii et al. | 277/94 |
| 3,519,316 | 7/1970 | Göthberg | 308/187.2 |
| 3,595,587 | 7/1971 | Senigalliesi | 277/169 |
| 3,811,688 | 5/1974 | Smith | 277/39 |
| 3,814,446 | 6/1974 | Derman | 308/187.1 |
| 4,094,518 | 6/1978 | Cox | 277/95 |
| 4,191,432 | 3/1980 | Miki et al. | 308/187.2 |

FOREIGN PATENT DOCUMENTS

| 591563 | 1/1960 | Canada | 308/187.2 |
| 110836 | 6/1941 | Sweden . | |

Primary Examiner—Richard R. Stearns
Attorney, Agent, or Firm—Price, Heneveld, Huizenga & Cooper

[57] ABSTRACT

A bearing assembly includes an outer race, an inner race, a plurality of rolling elements and a bellows seal. The seal includes first and second annular members having a sealing portion defining a groove within which a bead is slidably disposed. The sealing portion swivels on the bead and one of the members has a flexible membrane to accommodate axial and radial movement.

31 Claims, 9 Drawing Figures

U.S. Patent Jan. 5, 1982 Sheet 1 of 2 4,309,063

BEARING SEAL

BACKGROUND OF THE INVENTION

The present invention relates to bearings and more particularly to sealed bearing assemblies and seals therefor.

In certain applications, it is necessary to employ a bearing assembly which will accommodate shaft end play and misalignment. For example, bearings which support conveyor rollers should accommodate center loading of the rollers without undue stress. The bearing assemblies have a certain amount of designed-in internal clearance which avoides preload on the bearing elements and permits accommodation of radial and axial movement. Loose bearing assemblies are also used in trolley wheels of overhead trolley conveyor systems and in assemblies which guide conveyor chain around turns.

Bearing assemblies which accommodate such movement suffer from an inherent disadvantage. Repeated shifting of an inner race with respect to an outer race may produce a pumping action. Grease or other lubricant may be pumped out of the bearing and dirt, dust and the like may, in effect, be pumped in. When such assemblies are used in inherently dusty or dirty environments, such as in agricultural uses or in certain conveyor uses, a need exists to provide a seal which will seal both the inside and the outside of the bearing assembly while accommodating bearing movement.

Heretofore, attempts have been made to provide bearings and bearing seals which will protect the assembly from entry of foreign matter and from loss of lubricant. An example of one such approach may be found in U.S. Pat. No. 3,203,740 entitled BEARING SEAL and issued on Aug. 31, 1965, to Pieckii et al. As disclosed therein, an inner race of a ball bearing assembly is provided with an annular ridge. A sealing member carried by an outer race includes a pair of parallel lips which are deformed and ride one on each of the walls of the ridge structure. The inner lip seals in lubricant and an outer lip excludes dirt, dust and other foreign matter. Due to the construction of the seal, proper functioning requires accurate axial location of the lips of the seal. This is achieved by maintaining tolerances of the bearing structure during manufacture. Therefore, radial and axial movement of the inner race may have an adverse effect on the functioning of the seal.

Examples of other heretofore proposed sealing arrangements may be found in U.S. Pat. No. 2,144,691, entitled BEARING SEAL and issued on Jan. 24, 1939, to Schmal; U.S. Pat. No. 3,595,587, entitled PROTECTIVE SUPPORT FOR BALL BEARINGS and issued on July 27, 1971, to Senigalliesi; and U.S. Pat. No. 3,814,446, entitled SEALING ARRANGEMENT and issued on June 4, 1974, to Derman. Senigalliesi and Derman both disclose seals including flexible membrane portions which will accommodate radial and/or axial deformation of movement of the bearing.

A need exists for an effective and relatively easy to manufacture sealing structure which will readily accommodate radial and axial movement of a loose bearing assembly and which will negate the aformentioned pumping action.

SUMMARY OF THE INVENTION

In accordance with the present invention, a unique seal structure is provided whereby the problems heretofore experienced are substantially eliminated. Essentially, the seal is adapted for use with a bearing assembly of the type having an inner race or races, an outer race and a plurality of rolling elements rotatably disposed between the inner and outer races. The seal includes first and second annular members, each carried by or positioned adjacent one of the races. One of the members includes a radially and axially flexible portion and an annular seal portion defining a radially opening, generally semicircular groove having an inner and an outer lip. The second member includes a circumferentially extending, generally circular or toroidal shaped bead configured complementary to the semicircular groove. The bead is disposed within the groove and the elements are dimensioned to permit swiveling of the seal portion about the bead. The seal accommodates radial and axial movement of the inner race with respect to the outer race, seals in lubricant and seals out dust, dirt and other foreign matter.

DETAILED DESCRIPTION OF THE PREFERRED EMBODIMENT

Figure 1:
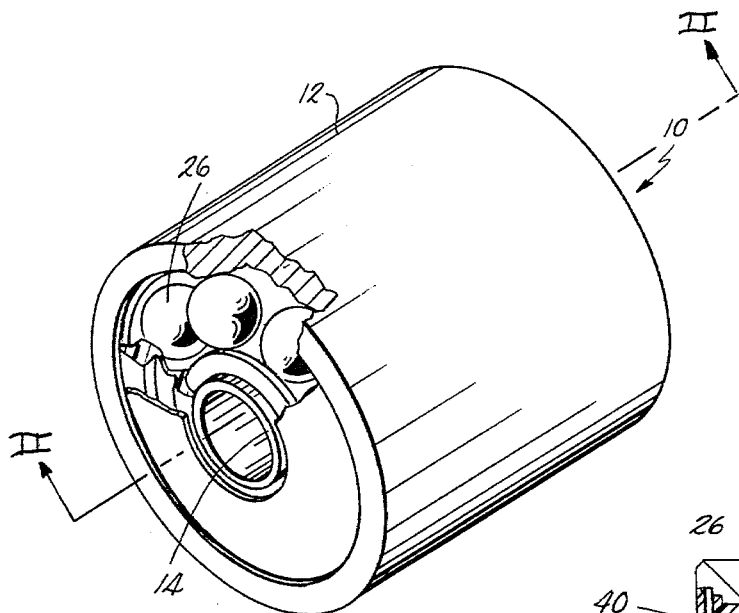
FIG. 1 is a fragmentary, partially sectioned, perspective view of a bearing assembly and seal in accordance with the present invention.
Figure 2:
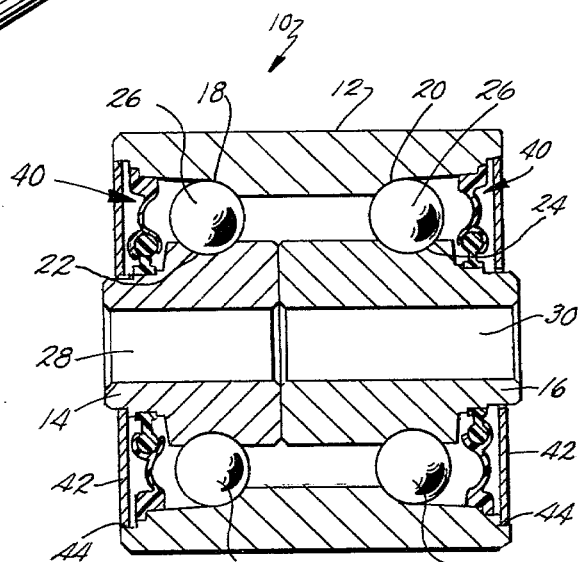
FIG. 2 is a longitudinal, cross-sectional view of the bearing assembly generally taken along line II—II of FIG. 1.

With reference to the drawings, FIGS. 1 and 2 illustrate a bearing assembly in accordance with the present invention and generally designated 10. Bearing assembly 10 includes an outer housing 12 and a pair of aligned, inner races 14, 16. Assembly 10 is a double row bearing assembly with housing 12 defining axially spaced, circumferentially extending grooves 18, 20. Grooves 18, 20 define outer raceways. Inner members 14, 16 define inner raceways or grooves 22, 24, respectively. Inner raceways 22, 24 retain rolling elements 26 within the assembly. Inner races 14, 16 define coaxial bores 28, 30 adapted to receive a shaft. Bearing assembly 10 is a loose assembly and is adapted for use in an overhead conveyor to guide a chain around a turn. Inner races 14, 16 will accommodate axial and radial movement with respect to housing 12. Lubricant is packed within the housing to lubricate anti-friction rolling elements 26 and the raceways.

In order to prevent pump out of lubricant and pump in of dirt, grit and other foreign matter, each end of the assembly is closed by a seal 40. The seals, in the embodiment illustrated, are protected by trash guards 42 disposed within counterbores 44 defined by housing 12. Trash guard 42 is not necessary for proper functioning of the seal 40. The guard is provided in environments where foreign material could be of such nature as to damage the seal. Seals 40 are designed to accommodate the axial and radial movement of the inner races with respect to the housing 12 and to provide an effective inner and outer seal to negate the pumping action previously referred to.

Figure 4:
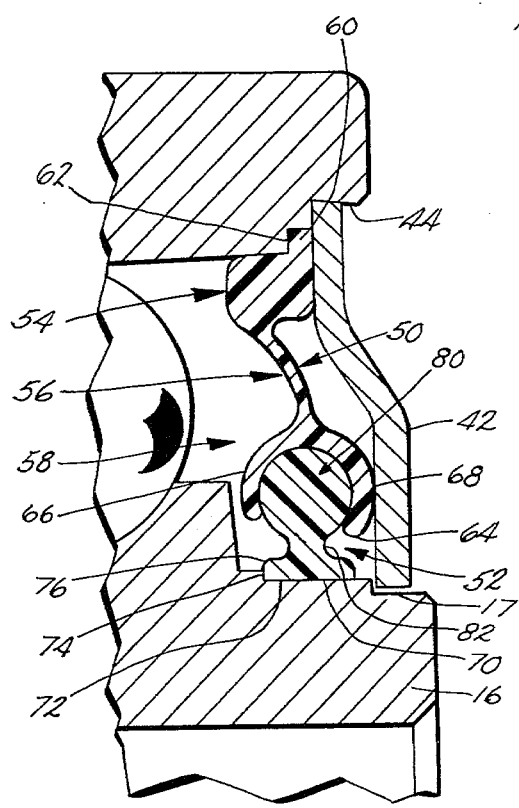
FIG. 4 is a greatly enlarged, fragmentary, cross-sectional view of the assembly showing a portion of the seal in accordance with the present invention.
Figure 3:
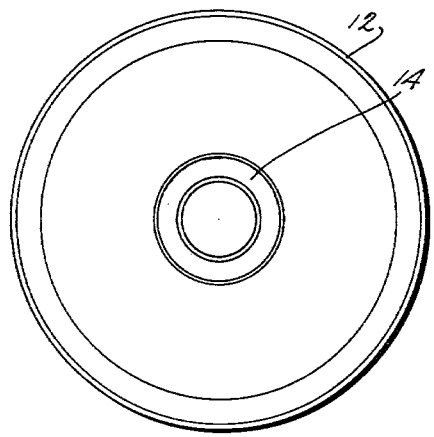
FIG. 3 is an end, elevational view of the assembly.
Figure 5:
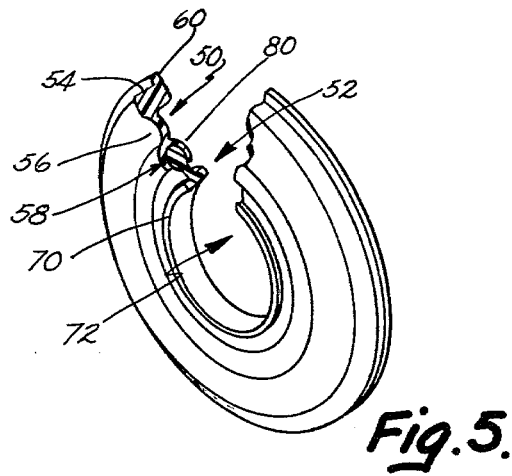
FIG. 5 is a fragmentary, partially sectioned, perspective view of the seal.

As best seen in FIGS. 4 and 5, seal 40 in accordance with the present invention includes a first, annular member 50 and a second, annular member 52. Annular member 50 includes a thickened, outer peripheral fastening or attachment portion 54, an intermediate, flexible membrane or bellows portion 56 and an inner peripherally extending seal portion 58. In the embodiment of FIG. 4, portion 54 includes a radially directed flange 60 configured to be disposed within a counterbore 62 defined by the inner peripheral surface of housing 12. Intermediate portion 56 is of relatively thin cross section or thickness and is flexible to accommodate radial and axial movement. Seal portion 58 defines a generally C-shaped or generally semicircular radially opening groove 64. Portion 58, therefore, includes a curved inner lip 66 and a curved outer lip 68.

Member 52 is also of annular configuration and includes a central hub or carrier portion 70 defining a central aperture 72. Carrier portion 70 is dimensioned to be pressed onto a peripheral surface 17 of the inner race member. Race 14 or 16 defines a stop or shoulder 74 against which an inner radial face 76 of carrier 70 abuts. Extending around the circumference of carrier 70 is a generally circular, bulbous or toroidal shaped bead 80. Bead 80 is joined to carrier 70 by an undercut, intermediate portion 82. As seen in FIGS. 4 and 5, groove 64 and bead 80 are of mating configuration with the bead disposed within the groove. In the construction illustrated in FIG. 4, inner lip 66 extends through an arc angle of approximately 90° while outer lip 68 extends through an arc angle greater than 90° but less than 180°. The latter arc angle is approximately 135°, as is clearly shown in FIG. 4.

As axial and radial movement occurs, flexible portion 56 of annular member 50 flexes and accommodates such movement. Further, seal portion 58 will swivel, pivot or rotate about generally circular bead 80. Sealing contact between the inner surface of the groove 64 and the outer peripheral surface of bead 80 is maintained during relative motion between inner and outer races. Inner lip 66 insures that lubricant within the housing is sealed in during relative movement and outer lip 68 insures that dirt, dust and other foreign matter is sealed out of the assembly.

Trash guard 42 is pressed into counterbore 44 of the outer race and contacts fastening portion 54 of the seal to hold the seal in position on the outer race or housing 12. Further, as seen in FIG. 4, trash guard 42 may contact outer lip 68 of seal portion 58 during axial movement. If so, the trash guard will bias the lip into contact with bead 80. Shoulder 74 on the inner race, contacted by carrier 70, insures that proper spacing is maintained between the seal and remaining portion of the race so that interference with the swivel action does not occur.

Although bead 80 and groove 64 have been illustrated in FIG. 4 as being in intimate contact throughout the peripheral surface of the groove, such is not necessary for proper functioning of the seal. A line contact preferably occurs at least at some points around the periphery of the bead. The overlapping nature of the lips and the bead insure proper sealing.

Figure 6:
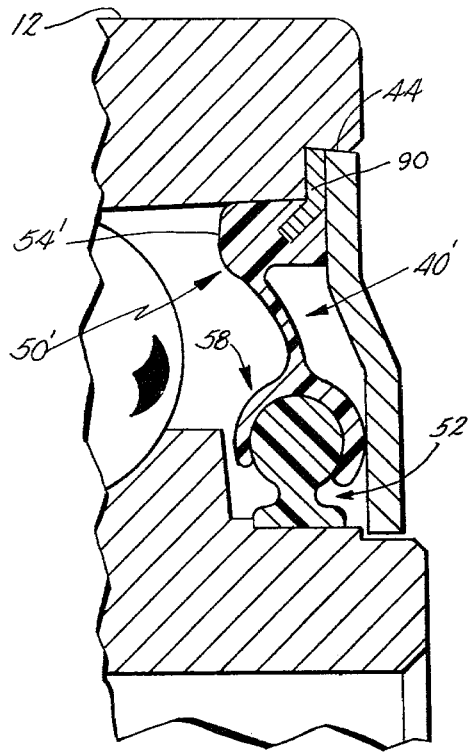
FIG. 6 is a greatly enlarged, fragmentary, cross-sectional view of the bearing assembly showing a portion of an alternative embodiment of the seal.

An alternative embodiment of seal 40 is illustrated in FIG. 6 and generally designated 40'. Embodiment 40' differs from embodiment 40 by the inclusion of an annular, angled, stiffening ring 90 which is molded integral with fastening portion 54' of the outer seal member 50'. With this embodiment, the radial flange or tab 60 is eliminated and stiffening and retaining ring 90 is received within the counterbore 44 of outer race 12.

In the preferred construction, seal member 50 is fabricated from an elastomeric material such as DuPont Hytrel polyester elastomer. The central portion or flexible intermediate portion 56 is formed thin enough so as to flex and to readily accommodate axial and radial movement of the inner race. It is preferred that the second seal member 52 be fabricated from a self-lubricating, relatively rigid plastic material. A suitable material would be an acetal resin such as that presently sold by DuPont under the trademark Delrin 500 CL. In the alternative, element 52 could be fabricated from other low friction materials such as an oil impregnated sintered metal. Also, it is presently preferred that each of the seal pieces 50, 52 be essentially one-piece members.

Figure 9:
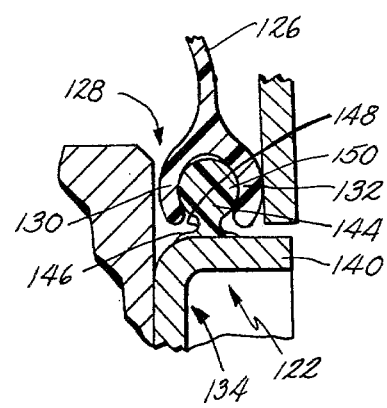
FIG. 9 is a greatly enlarged, cross-sectional, fragmentary view showing a portion of the bearing assembly and seal of FIG. 7.
Figure 7:
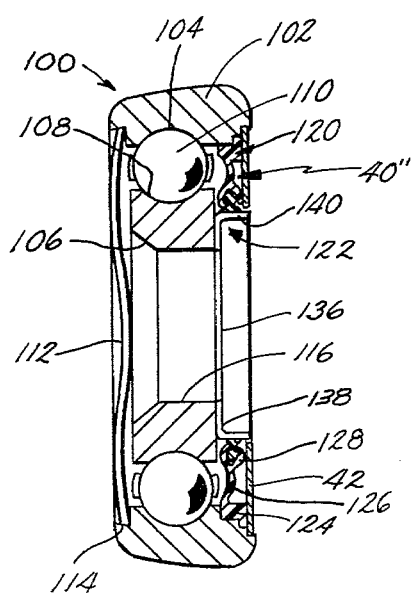
FIG. 7 is a cross-sectional view of another bearing assembly showing another alternative construction of the seal.
Figure 8:
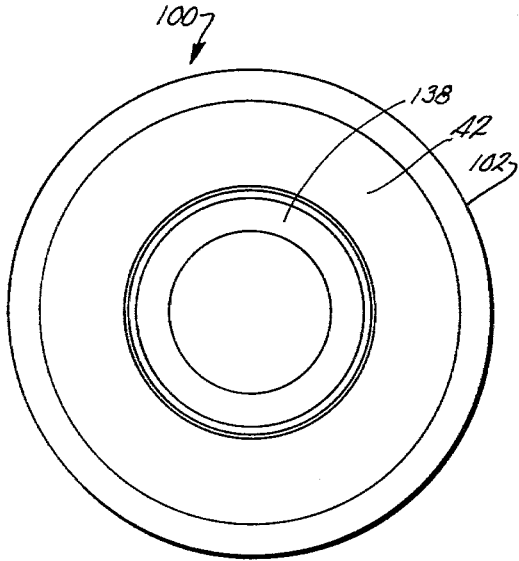
FIG. 8 is an end, elevational view of the bearing assembly of FIG. 7.

A further alternative embodiment of a bearing assembly and seal in accordance with the present invention is illustrated in FIGS. 7, 8 and 9. As shown therein, bearing assembly 100 is a trolley wheel of the general type disclosed in U.S. Pat. No. 3,537,725, entitled TROUGH-LIKE SEAL FOR A ROLLER ASSEMBLY and issued on Nov. 3, 1970, to R. E. Frost. Assembly 100 includes an outer race 102 defining an outer raceway groove 104, an inner race 106 defining an inner raceway groove 108 and a plurality of rolling elements 110 disposed within the raceways. An outer end of assembly 100 is closed by a circular sealing member 112 which is snapped or pressed into a counterbore 114 defined by outer race 102. Inner race 106 defines a bore 116 for receipt of a shaft member. The inner surface or inner face of assembly 100 is closed by a seal 40" and a trash guard 42. Seal 40" includes a first, annular sealing member 120 and a second, annular sealing member 122. As with embodiment 40 illustrated in FIGS. 4 and 5, seal element 120 includes an outer circumferentially extending fastening portion 124, an intermediate, flexible bellows portion 126 and an inner seal portion 128. As best seen in FIG. 9, seal portion 128 includes an inner lip 130 and an outer lip 132. Portion 128 differs from portion 58 of embodiment 40 in that the lips extend through equal arc angles which are greater than 90° (FIG. 9).

Seal portion 122 includes a rigid, metal carrier 134 of generally annular shape. Carrier 134 defines a central aperture 136, an intermediate portion 138 and a peripheral, axially extending flange 140. Carrier 134 is basically cup-shaped in cross section. Bonded to the outer periphery of flange 140 is a bulbous protrusion or toroidal-shaped bead 144. Bead 144 includes a base 146 joined to flange 140, an undercut or intermediate portion 148 and a generally circular portion 150. As with the previous embodiments, portion 150 is disposed within sealing portion 128 and the sealing portion 128 may swivel, rock or pivot about portion 150 during operation of the bearing assembly. Carrier 134 is positioned immediately adjacent inner race 106 and the bead portion of the seal is spaced from the race so that swiveling action is not interfered with.

In a presently existing embodiment of the seal in accordance with the present invention, first annular member 50 is fabricated from DuPont Hytrel polyester elastomer and has an outer diameter of approximately 2.29 inches. Intermediate portion 56 is formed in a relaxed state with a radius of 0.14 inches and has a thickness of approximately 0.018 inches. Lip 66 is formed with a thickness of approximately 0.025 inches and outer lip 68 is formed with a thickness of approximately 0.035 inches. Groove 64 has a radius of curvature of 0.085 inches. The diameter of the seal at the inner peripheral face of lip 66 is 1.30 inches and the diameter of the seal at the inner peripheral face of lip 68 is 1.13 inches. Seal element 52 is fabricated from DuPont Delrin 500 CL acetal resin and has an outer diameter of 1.45 inches. Bead 80 has a diameter of 0.157 inches, the outer diameter of carrier portion 70 has a diameter of 1.06 inches, an axial dimension of 0.150 inches and the diameter of the central aperture 72 is 0.925 inches.

The seal and bearing assembly in accordance with the present invention negates pumping action which has heretofore resulted in a loss of grease and an ingestion of dirt, dust and other foreign matter. The seal is primarily adapted for loose bearings and low speed conditions. The seal is excellent for applications in agricultural equipment, trolley conveyors and in conveyor rollers.

In view of the foregoing description, those of ordinary skill will undoubtedly envision various modifications which would not depart from the inventive concepts disclosed herein. For example, seal portion 50 could be fabricated from more than one piece or from different materials. Further, positioning of the elements could be reversed from that illustrated with the flexible portion being carried on the inner face with a groove open radially outwardly to receive a bead carried by the outer race. Therefore, it is expressly intended that the above description should be considered as only that of the preferred embodiment. The true spirit and scope of the present invention may be determined by reference to the appended claims.

The embodiments of the invention in which an exclusive property or privilege is claimed are defined as follows:

1. A seal adapted to accommodate rocking, radial movement and axial movement of an inner race with respect to an outer race in a bearing assembly, said seal comprising:
   a first member adapted to be held by one of said inner and outer races, said first member including a radially and axially flexible portion and an annular seal portion joined to said flexible portion and defining a radially opening, generally semicircular groove having an inner lip and an outer lip; and
   a second member adapted to be held adjacent one of said inner and outer races, said second member including an annular carrier and a circumferentially extending, generally circular bead, said bead being configured complementarily to said groove and being disposed within said groove, said groove and said bead dimensioned to permit swiveling of said groove about said bead, said inner lip sealing lubricant in said bearing assembly and said outer lip sealing dust, dirt and the like out of said bearing assembly while said flexible portion and said groove and bead accommodate radial and axial movement and rocking of the inner race with respect to said outer race.

2. A seal as defined by claim 1 wherein said first annular member includes a fastener portion adapted to secure said member to one of said races, said flexible portion joining said annular seal portion to said fastener portion.

3. A seal as defined by claim 2 wherein said second member includes an annular intermediate portion joining said bead to said annular carrier.

4. A seal as defined by claim 3 wherein one of said lips of said annular seal portion extends through an arc angle of at least 90° and the other one of said lips extends through an arc angle greater than 90° and less than 180°.

5. A seal as defined by claim 3 wherein said first member is adapted to be held by the outer race and said groove opens radially inwardly.

6. A seal as defined by claim 5 wherein said bead extends around the outer periphery of said carrier.

7. A seal as defined by claim 6 wherein said first member is fabricated from a flexible elastomeric material and said second member is fabricated from a rigid, self-lubricating plastic material.

8. A bellows seal for a bearing assembly of the type having an inner race, an outer race and a plurality of rolling elements rotatably disposed between said inner and outer races, said seal comprising:
   a first annular member having an outer circumferential portion adapted to be held by the outer race, a flexible central portion and an inner circumferential sealing portion, said sealing portion defining a radially opening, generally semicircular groove; and
   a second annular member having a circumferentially extending seal portion of a generally toroidal shape, said seal portion being disposed within said semicircular groove of said first annular member, said sealing portion and said seal portion dimensioned so that said sealing portion may swivel about said seal portion during operation of the bearing assembly whereby said seal will accommodate radial and axial movement of said races and seal lubricant in and dirt out of said bearing assembly.

9. A bellows seal as defined by claim 8 wherein at least one of said sealing portions and said seal portion is formed from a material having a low coefficient of friction.

10. A bellows seal as defined by claim 9 wherein said first annular member is a one-piece member.

11. A bellows seal as defined by claim 10 wherein said second annular member is a one-piece member.

12. A bellows seal as defined by claim 8 wherein said sealing portion of said first annular member defines axially spaced lips, one of said lips extending throughh an arc of at least 90° and the other of said lips extending through an arc greater than 90° and less than 180°.

13. A bellows seal as defined by claim 12 wherein the radius of curvature of said sealing portion groove is greater than the radius of curvature of said seal portion of said second annular member.

14. A bellows seal as defined by claim 13 wherein said second annular member includes:
   a central, annular hub portion; and
   an intermediate portion joining said seal portion to said hub portion.

15. A bellows seal as defined by claim 14 wherein said second annular member is of one-piece construction.

16. A bellows seal as defined by claim 14 wherein said central annular hub is a rigid member defining a central aperture and an axially extending outer peripheral flange, said intermediate portion being on said peripheral flange.

17. A bellows seal as defined by claim 8 wherein said second annular member includes:
 a central, annular hub portion; and
 an intermediate portion joining said seal portion to said hub portion.

18. A bellows seal as defined by claim 17 wherein said second annular member is of one-piece construction.

19. A bellows seal as defined by claim 17 wherein said central annular hub is a rigid member defining a central aperture and an axially extending outer peripheral flange, said intermediate portion being on said peripheral flange.

20. A bellows seal as defined by claim 17 wherein said first annular member central portion is formed from an elastomeric material.

21. A bellows seal as defined by claim 220 wherein said toroidal-shaped seal portion is a low coefficient of friction material.

22. A bearing assembly of the type including an outer race defining an outer raceway, a radially spaced inner race defining an inner raceway and a plurality of rolling elements engaging said outer and inner raceways, the improvement comprising a bellows seal means carried by said bearing assembly for sealing lubricant in the assembly and preventing ingress of foreign material and for accommodating axial and radial movement of said races with respect to each other, said bellows seal comprising:
 a first annular shaped member held by one of said inner and outer races and having a central, circumferentially extending flexible portion and a sealing portion defining a radially opening generally semicircular groove having an inner curved lip and an outer curved lip; and
 a second annular member on one of said inner and outer races and defining a toroidal-shaped bead slidably disposed within and at least partially encircled by said sealing portion, said sealing portion and said bead dimensioned to permit said sealing portion to swivel about said bead while maintaining contact with said bead.

23. A bearing assembly as defined by claim 22 wherein said first annular member includes a thickened fastener portion disposed within a groove defined by one of said races.

24. A bearing assembly as defined by claim 23 wherein said second annular member includes a carrier hub defining a central aperture and said hub is disposed on said inner race.

25. A bearing assembly as defined by claim 24 wherein said inner lip extends through an arc angle of at least 90° and the outer lip extends through an arc angle greater than 90° and less than 180°.

26. A bearing assembly as defined by claim 25 wherein said second annular member is fabricated from a rigid, self-lubricating plastic material and said first annular member is fabricated from an elastomeric material.

27. A bearing assembly as defined by claim 26 further including an annular shaped trash shield carried by said outer race and having a central aperture.

28. A bearing assembly as defined by claim 23 wherein said second annular member includes a rigid, flat member having an axial face contacting an axial face of said inner race, said flat member further including an outer circumferentially extending axially directed flange, said bead being disposed on said flange and extending around the outer peripheral surface of said flange.

29. A bearing assembly as defined by claim 28 wherein said inner lip extends through an arc angle of at least 90° and the outer lip extends through an arc angle greater than 90° and less than 180°.

30. A bearing assembly as defined by claim 29 wherein said bead is formed from a rigid, self-lubricating plastic material and said first annular member is formed from an elastomeric material.

31. A bearing assembly as defined by claim 30 further including an annular shaped trash shield carried by said outer race and having a central aperture.

* * * * *

UNITED STATES PATENT AND TRADEMARK OFFICE
CERTIFICATE OF CORRECTION

PATENT NO. : 4,309,063
DATED : January 5, 1982
INVENTOR(S) : Siegfried K. Weis

It is certified that error appears in the above—identified patent and that said Letters Patent is hereby corrected as shown below:

Column 6, claim 12, line 57:

"throughh" should be --through--;

Column 7, claim 21, line 23:

"220" should be --20--.

Signed and Sealed this

Twenth-eighth Day of September 1982

[SEAL]

Attest:

GERALD J. MOSSINGHOFF

Attesting Officer     Commissioner of Patents and Trademarks